United States Patent
Siomina et al.

(10) Patent No.: US 9,635,637 B2
(45) Date of Patent: Apr. 25, 2017

(54) METHODS AND APPARATUS FOR SUPPORTING INTER-FREQUENCY MEASUREMENTS

(71) Applicant: Telefonaktiebolaget LM Ericsson (publ), Stockholm OT (SE)

(72) Inventors: Iana Siomina, Täby (SE); Muhammad Kazmi, Bromma (SE); Walter Müller, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/173,882

(22) Filed: Jun. 6, 2016

(65) Prior Publication Data
US 2016/0316447 A1 Oct. 27, 2016

Related U.S. Application Data

(63) Continuation of application No. 14/591,146, filed on Jan. 7, 2015, now Pat. No. 9,414,349, which is a
(Continued)

(51) Int. Cl.
*H04W 4/00* (2009.01)
*H04W 64/00* (2009.01)
(Continued)

(52) U.S. Cl.
CPC .......... *H04W 64/00* (2013.01); *H04W 24/10* (2013.01); *H04W 88/02* (2013.01); *H04W 88/08* (2013.01)

(58) Field of Classification Search
CPC .................................................... H04W 64/00
(Continued)

(56) References Cited

U.S. PATENT DOCUMENTS 8,295,859 B1 10/2012 Yarkan et al.
8,406,790 B2 3/2013 Kazmi et al.
(Continued)

FOREIGN PATENT DOCUMENTS

WO 2008085952 A1 7/2008
WO 2009038359 A2 3/2009
(Continued)

OTHER PUBLICATIONS

Nokia, "Applicability of mobility requirements with inter-frequency RSTD measurements", 3GPP TSG-RAN Meeting #55, May 10-14, 2010, Montreal, Canada, R4-102039.
(Continued)

*Primary Examiner* — Christopher M Brandt
(74) *Attorney, Agent, or Firm* — Coats & Bennett, PLLC

(57) ABSTRACT

The invention relates to methods and devices for supporting configuration of a measurement gap pattern for a user equipment requiring measurement gaps for performing an inter-frequency measurement. A radio network node receives an indication from the user equipment that the user equipment is going to perform an inter-frequency measurement for positioning, which inter-frequency measurement requires measurement gaps. The radio network node may determine a measurement gap pattern for performing the inter-frequency measurement and may signal, to the user equipment, information to initiate use of the determined measurement gap pattern in the user equipment. Alternatively the user equipment configures the measurement gap pattern itself based on a set of pre-defined rules.

16 Claims, 8 Drawing Sheets

Related U.S. Application Data continuation of application No. 13/697,252, filed as application No. PCT/SE2011/050519 on Apr. 28, 2011, now Pat. No. 8,965,414.

(60) Provisional application No. 61/333,007, filed on May 10, 2010.

(51) Int. Cl.
  *H04W 24/10* (2009.01)
  *H04W 88/02* (2009.01)
  *H04W 88/08* (2009.01)

(58) Field of Classification Search
  USPC .................. 455/456.1, 456.2, 456.5, 456.6
  See application file for complete search history.

(56) References Cited

U.S. PATENT DOCUMENTS

| | | |
|---|---|---|
| 8,750,808 B2 | 6/2014 | Kazmi et al. |
| 2008/0132247 A1 | 6/2008 | Anderson |
| 2008/0146231 A1 | 6/2008 | Huang et al. |
| 2008/0189970 A1 | 8/2008 | Wang et al. |
| 2009/0005029 A1 | 1/2009 | Wang et al. |
| 2009/0131073 A1 | 5/2009 | Carlson et al. |
| 2009/0296620 A1 | 12/2009 | Umesh et al. |
| 2009/0325501 A1 | 12/2009 | Somasundaram et al. |
| 2010/0113035 A1 | 5/2010 | Eskicioglu et al. |
| 2010/0120447 A1 | 5/2010 | Anderson et al. |
| 2010/0240358 A1 | 9/2010 | Jen et al. |
| 2010/0304748 A1 | 12/2010 | Henttonen et al. |
| 2010/0317343 A1 | 12/2010 | Krishnamurthy et al. |
| 2010/0323720 A1 | 12/2010 | Jen |
| 2011/0039577 A1 | 2/2011 | Stern-Berkowitz et al. |
| 2011/0098057 A1 | 4/2011 | Edge et al. |
| 2011/0117926 A1 | 5/2011 | Hwang et al. |
| 2011/0124347 A1 | 5/2011 | Chen et al. |
| 2012/0083278 A1 | 4/2012 | Kazmi et al. |
| 2012/0184290 A1 | 7/2012 | Kazmi et al. |
| 2012/0252487 A1 | 10/2012 | Siomina et al. |
| 2012/0287800 A1 | 11/2012 | Siomina et al. |
| 2013/0295958 A1 | 11/2013 | Siomina et al. |
| 2014/0094188 A1 | 4/2014 | Kazmi et al. |

FOREIGN PATENT DOCUMENTS

| | | |
|---|---|---|
| WO | 2009065012 A2 | 5/2009 |
| WO | 2010107356 A1 | 9/2010 |
| WO | 2011016805 A1 | 2/2011 |
| WO | 2011020008 A2 | 2/2011 |
| WO | 2011097730 A1 | 8/2011 |
| WO | 2012099514 A1 | 7/2012 |

OTHER PUBLICATIONS

3rd Generation Partnership Project, "Technical Specification Group Radio Access Network; Evolved Universal Terrestrial Radio Access (E-UTRA); Physical Channels and Modulation (Release 9)", 3GPP TS 36.211 V9.1.0, Mar. 2010, pp. 1-85.
3rd Generation Partnership Project, "Technical Specification Group Radio Access Network; Evolved Universal Terrestrial Radio Access (E-UTRA); LTE Positioning Protocol (LPP) (Release 9)", 3GPP TS 36.355 V9.1.0, Mar. 2010, pp. 1-111.
3rd Generation Partnership Project, "Technical Specification Group Radio Access Network; Evolved Universal Terrestrial Radio Access (E-UTRA); LTE Positioning Protocol A (LPPa) (Release 9)", 3GPP TS 36.455 V9.1.0, Mar. 2010, pp. 1-51.
3rd Generation Partnership Project, "Technical Specification Group Radio Access Network; Evolved Universal Terrestrial Radio Access (E-UTRA); Physical layer; Measurements (Release 9)", 3GPP TS 36.214 V9.1.0, Mar. 2010, pp. 1-14.
3rd Generation Partnership Project, "Technical Specification Group Radio Access Network; Evolved Universal Terrestrial Radio Access (E-UTRA); Radio Resource Control (RRC); Protocol Specification (Release 8)", 3GPP TS 36.331 V8.9.0, Mar. 2010, pp. 1-211.
3rd Generation Partnership Project, "Technical Specification Group Radio Access Network; Evolved Universal Terrestrial Radio Access (E-UTRA); Requirements for support of radio resource management (Release 8)", 3GPP TS 36.133 V8.9.0, Mar. 2010, pp. 1-328.
Qualcomm Europe, "TS 36.305: Enhanced cell ID", 3GPP TSG-RAN WG2 #66, May 4, 2009, pp. 1-5, San Francisco, CA, USA, R2-093456.
3rd Generation Partnership Project, "Technical Specification Group Radio Access Network; Evolved Universal Terrestrial Radio Access (E-UTRA); Radio Resource Control (RRC); Protocol specification (Release 10)", 3GPP TS 36.331 V10.1.0, pp. 1-289, Mar. 2011.
European Telecommunications Standards Institute, "LTE; Evolved Universal Terrestrial Radio Access Network (E-UTRAN); Stage 2 functional specification of User Equipment (UE) positioning in E-UTRAN (3GPP TS 36.305 version 10.1.0 Release 10)", ETSI TS 136 305 V10.1.0, Apr. 2011, pp. 7,11, 16-19, 40-42.
3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.6.0, Mar. 2011, pp. 1-252.
Catt, et al., "Introduction of OTDOA inter-freq RSTD measurement indication procedure", 3GPP TSG-RAN WG2 Meeting #73, Taipei, Change Request 36.355 CR 0053, Rev. 1, Version 10.0.0, R2-111691, Feb. 8, 2011, pp. 1-5, 3GPP.
Nokia Siemens Networks, et al., "Measurement Gap Creation", 3GPP TSG-RAN WG4 Meeting #43bis, Jun. 25-29, 2007, Orlando, FL, R4-070927.
Sharp, "Measurement Gap Control for E-UTRAN", 3GPP TSG-RAN WG2#55, Oct. 9-13, 2006, Seoul, Korea, R2-062928.
Nokia, "Mobility requirements and inter-frequency RSTD measurements", 3GPP TSG-RAN WG4 Ad hoc meeting #10-02, Mar. 12-16, 2010, Dublin, Ireland, R4-101388.
Motorola, "Measurement Gap Control for E-UTRAN to GERAN Handover", 3GPP RAN-GERAN Workshop on GERAN/LTE, Sep. 27-28, 2007, Sophia-Antipolis, France, GR-070006.
Huawei, "Considerations on Gap Length Design for Gap-assisted E-UTRA Measurements", 3GPP TSG-RAN WG4 Working Group 4 (Radio) meeting #43bis, Jun. 25-29, 2007, Orlando, FL, R4-070958.
Ericsson et al., "Measurement gap configuration for inter-freq RSTD measurement", 3GPP TSG-RAN WG2 #72, Nov. 15-19, 2010, Jacksonville, FL, R2-106464.
Ericsson et al., "Inter-frequency measurements for OTDOA positioning", 3GPP TSG RAN WG4 meeting #54, Feb. 22-26, San Francisco, CA, R4-100874.
Huawei et al., "Remaining issues when UE performs inter-frequency RSTD measurement", 3GPP TSG RAN WG4 (Radio) #57 AH, Jan. 17-21, 2011, Austin, US, R4-110177.
3rd Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 10)", 3GPP TS 36.305 V10.1.0, Mar. 2011, pp. 1-11.
Catt et al., "Introduction of OTDOA inter-freq RSTD measurement indication procedure", 3GPP TSG-RAN WG2 Meeting #72bis, Jan. 17-21, 2011, pp. 1-3, Dublin, Ireland, R2-110646.
Catt, "Summary of [72b#25]: Measurement gap request procedure for OTDOA", 3GPP TSG RAN WG2 Meeting #73, Feb. 21-25, 2011, pp. 1-5, Taipei, R2-111144.

METHODS AND APPARATUS FOR SUPPORTING INTER-FREQUENCY MEASUREMENTS

RELATED APPLICATIONS

The present application is a continuation of U.S. patent application Ser. No. 14/591,146, which was filed on Jan. 7, 2015, which application is a continuation of U.S. patent application Ser. No. 13/697,252, which was filed on Nov. 9, 2012 and issued as U.S. Pat. No. 8,965,414 on Feb. 24, 2015, which is a national stage application of PCT/SE2011/050519, filed Apr. 28, 2011, and claims benefit of U.S. Provisional Application 61/333,007, filed May 10, 2010, the disclosures of each of which are incorporated herein by reference in their entirety.

TECHNICAL FIELD

This invention relates in general to inter-frequency measurements in wireless communication networks and in particular to the signaling support for such measurements in wireless network architectures that utilize signal measurements from multiple cells for e.g. positioning, location, and location-based services.

BACKGROUND

The Universal Mobile Telecommunication System (UMTS) is one of the third generation mobile communication technologies designed to succeed GSM. 3GPP Long Term Evolution (LTE) is a project within the 3$^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a user equipment (UE) 150a is wirelessly connected to a radio base station (RBS) 110a commonly referred to as an evolved NodeB (eNodeB), as illustrated in FIG. 1a. Each eNodeB 110a, 110b serves one or more areas each referred to as cells 120a, 120b, and are connected to the core network. In LTE, the eNodeBs 110a, 110b are connected to a Mobility Management Entity (MME) (not shown) in the core network. A positioning server 140, also called a location server, in the control plane architecture in FIG. 1a is connected to the MME. The positioning server 140 is a physical or logical entity that manages positioning for a so called target device, i.e. a wireless device that is being positioned. The positioning server is in the control plane architecture also referred to as an Evolved Serving Mobile Location Center (E-SMLC). As illustrated in FIG. 1a, the E-SMLC 140 may be a separate network node, but it may also be a functionality integrated in some other network node. In a user plane architecture, the positioning is a part of a Secure User Plane Location (SUPL) Location Platform (SLP). The positioning server may be connected to radio network nodes via logical links while using one or more physical connections via other network nodes e.g., the MME. A Network Management (NM) or Operations and Maintenance (O&M) node 141 may be provided to perform different network management operations and activities in the network.

The possibility of identifying user geographical location in a network has enabled a large variety of commercial and non-commercial services, e.g., navigation assistance, social networking, location-aware advertising, emergency calls, etc. Different services may have different positioning accuracy requirements imposed by an application. In addition, some regulatory requirements on the positioning accuracy for basic emergency services exist in some countries, e.g., FCC E911 in the U.S.

Three key network elements in an LTE positioning architecture are a Location Services (LCS) Client, an LCS target and an LCS Server. The LCS Server is a physical or logical entity managing positioning for a LCS target device by collecting measurements and other location information, assisting the terminal in measurements when necessary, and estimating the LCS target location. The LCS Client is a software and/or hardware entity that interacts with the LCS Server for the purpose of obtaining location information for one or more LCS targets, i.e. the entities being positioned. The LCS Clients may reside in the LCS targets themselves. An LCS Client sends a request to the LCS Server to obtain location information, and the LCS Server processes and serves the received requests and sends the positioning result and optionally a velocity estimate to the LCS Client. A positioning request can be originated from a terminal or the network.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. In the control plane, LPP uses RRC protocol as a transport.

LPPa is a protocol between eNodeB and LCS Server specified mainly for control-plane positioning procedures, although it still can assist user-plane positioning by querying eNodeBs for information and eNodeB measurements. Secure User Plane (SUPL) protocol is used as a transport for LPP in the user plane. LPP has also a possibility to convey LPP extension messages inside LPP messages, e.g., currently Open Mobile Alliance (OMA) LPP extensions (LPPe) are being specified to allow, e.g., for operator- or manufacturer-specific assistance data or assistance data that cannot be provided with LPP or to support other position reporting formats or new positioning methods. LPPe may also be embedded into messages of other positioning protocol, which is not necessarily LPP.

A high-level architecture, as it is currently standardized in LTE, is illustrated in FIG. 2, where the LCS target is a terminal 200, and the LCS Server is an E-SMLC 201 or an SLP 202. In the figure, the control plane positioning protocols with E-SMLC as the terminating point are shown by arrows 203, 204 and 205, and the user plane positioning protocol is shown by arrows 206 and 207. The SLP 202 may comprise two components, SUPL Positioning Centre (SPC) and SUPL Location Centre (SLC), which may also reside in different nodes. In an example implementation, the SPC has a proprietary interface with the E-SM LC 201, and an Llp interface with SLC, and the SLC part of SLP communicates with a PDN-Gateway (P-GVV) (not shown) and an external LCS Client 208.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

UE positioning is a process of determining UE coordinates in space. Once the coordinates are available, they may be mapped to a certain place or location. The mapping function and delivery of the location information on request are parts of a location service which is required for basic emergency services. Services that further exploit a location knowledge or that are based on the location knowledge to offer customers some added value are referred to as location-aware and location-based services. The possibility of identifying a wireless device's geographical location in the network has enabled a large variety of commercial and non-commercial services, e.g., navigation assistance, social networking, location-aware advertising, and emergency calls. Different services may have different positioning accuracy requirements imposed by an application. Furthermore, requirements on the positioning accuracy for basic emergency services defined by regulatory bodies exist in some countries. An example of such a regulatory body is the Federal Communications Commission regulating the area of telecommunications in the United States.

In many environments, a wireless device position can be accurately estimated by using positioning methods based on Global Positioning System (GPS). Nowadays, networks also often have a possibility to assist wireless devices in order to improve the device receiver sensitivity and GPS start-up performance, as for example in an Assisted-GPS (A-GPS) positioning method. GPS or A-GPS receivers, however, may not necessarily be available in all wireless devices. Furthermore, GPS is known to often fail in indoor environments and urban canyons. A complementary terrestrial positioning method, called Observed Time Difference of Arrival (OT-DOA), has therefore been standardized by 3 GPP. In addition to OTDOA, the LTE standard also specifies methods, procedures, and signaling support for Enhanced Cell ID (E-CID) and Assisted-Global Navigation Satellite System (A-GNSS) positioning. In future, Uplink Time Difference of Arrival (UTDOA) may also be standardized for LTE.

OTDOA Positioning

With OTDOA, a wireless device such as a UE measures the timing differences for downlink reference signals received from multiple distinct locations. For each measured neighbor cell, the UE measures Reference Signal Time Difference (RSTD) which is the relative timing difference between a neighbor cell and the reference cell. As illustrated in FIG. 3, the UE position estimate is then found as the intersection 430 of hyperbolas 440 corresponding to the measured RSTDs. At least three measurements from geographically dispersed RBSs 410a-c with a good geometry are needed to solve for two coordinates of the UE. In order to find the position, precise knowledge of transmitter locations and transmit timing offsets is needed. Position calculations may be conducted, for example by a positioning node such as the E-SMLC or the SLP in LTE, or by the UE. The former approach corresponds to the UE-assisted positioning mode, and the latter corresponds to the UE-based positioning mode.

In UTRAN Frequency Division Duplex (FDD), an SFN-SFN type 2 measurement (SFN stands for System Frame Number) performed by the UE is used for the OTDOA positioning method. This measurement is the relative timing difference between cell j and cell i based on the primary Common Pilot Channel (CPICH) from cell j and cell i. The UE reported SFN-SFN type 2 is used by the network to estimate the UE position.

Positioning Reference Signals

To enable positioning in LTE and facilitate positioning measurements of a proper quality and for a sufficient number of distinct locations, physical signals dedicated for positioning, such as positioning reference signals (PRS), have been introduced, and low-interference positioning subframes have been specified in 3GPP. PRS are transmitted from one antenna port R6 according to a pre-defined pattern, as described in more detail below.

A frequency shift, which is a function of a Physical Cell Identity (PCI), can be applied to the specified PRS patterns to generate orthogonal patterns and model an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g., cell-specific reference signals (CRS) may also be used for positioning measurements.

PRS are transmitted according to a pre-defined pattern and following one of the pre-defined PRS configurations. PRS are transmitted in pre-defined positioning subframes grouped by a number N_prs of consecutive subframes, i.e. one positioning occasion, as illustrated in FIG. 4. Positioning occasions occur periodically with a certain periodicity of N subframes, corresponding to a time interval T_prs between two positioning occasions. The standardized time intervals T_prs are 160, 320, 640, and 1280 ms, and the number of consecutive subframes N_prs are 1, 2, 4, and 6. Each pre-defined PRS configuration comprises PRS transmission bandwidth, N_prs and T_prs.

OTDOA Assistance Information

Since for OTDOA positioning PRS signals from multiple distinct locations need to be measured, the UE receiver often will have to deal with PRS that are much weaker than those received from the UE's serving cell. Furthermore, without approximate knowledge of when the measured signals are expected to arrive in time and what is the exact PRS pattern used, the UE would need to do signal search within a large window, which would impact the time and accuracy of the measurements as well as the UE complexity. To facilitate UE measurements, assistance information, also referred to as assistance data, is transmitted to the UE, which includes e.g. reference cell information, a neighbor cell list containing PCIs of neighbor cells, the number of consecutive downlink subframes N-prs, PRS transmission bandwidth, and frequency.

The assistance information is signaled over LPP from the positioning server, e.g., an E-SMLC in the control plane for an LTE system, to the UE.

OTDOA Inter-Frequency Measurements and Measurement Gaps

In LTE OTDOA, the UE measures Reference Signal Time Difference (RSTD) which has been defined in the standard as the relative timing difference between cell j and cell i, defined as $T_{SubframeRxj} - T_{SubframeRxi}$, where: $T_{SubframeRxj}$ is the time when the UE receives the start of one subframe from cell j, $T_{SubframeRxi}$ is the time when the UE receives the corresponding start of one subframe from cell i that is closest in time to the subframe received from cell j. The reference point for the observed subframe time difference shall be the antenna connector of the UE. The measurements are specified for both intra-frequency and inter-frequency and conducted in the RRC_CONNECTED state.

The inter-frequency measurements, including RSTD, are conducted during periodic inter-frequency measurement gaps which are configured in such a way that each gap starts at an SFN and subframe meeting the following condition:

SFN mod T=FLOOR(gapOffset/10);

subframe=gapOffset mod 10;

with T=MGRP/10, where MGRP stands for "measurement gap repetition period" and mod is the modulo function. The E-UTRAN is required according to the standard to provide a single measurement gap pattern with constant gap duration for concurrent monitoring of all frequency layers and Radio Access Technologies (RATs). Two configurations are according to the standard required to be supported by the UE, with MGRP of 40 and 80 milliseconds (ms), both with a measurement gap length of 6 ms. In practice, due to switching time, this leaves less than 6 but at least 5 full subframes for measurements within each such measurement gap.

In LTE, measurement gaps are configured by the network, i.e. the eNodeB, to enable measurements on different LTE frequencies and/or different RATs such as e.g., UTRA, GSM and CDMA2000. A measurement is configured using the Radio Resource Control (RRC) protocol to signal a measurement configuration to the UE. The gap configuration is signaled to the UE as part of the measurement configuration. Only one gap pattern can be configured at a time. The same pattern is used for all types of configured measurements, e.g. inter-frequency neighbor cell measurements, inter-frequency positioning measurements, inter-RAT neighbor cell measurements, inter-RAT positioning measurements, etc.

In multi-carrier LTE, the inter-frequency measurement gaps are so far intended mainly for performing cell identification and mobility measurements, such as Reference Signal Receiver Power (RSRP) and Reference Signal Received Quality (RSRQ). These measurements require a UE to perform measurements over the synchronization signals, i.e., the primary synchronization signals (PSS) and secondary synchronization signals (SSS), and cell-specific reference signals (CRS) to enable inter-frequency handover and enhance system performance. Synchronization signals are transmitted over 62 resource elements in the center of the allocated bandwidth in subframes 0 and 5. The PSS is transmitted in the last OFDM symbol and the SSS is transmitted in the second to last OFDM symbol of the first slot of a subframe. CRS symbols are transmitted every subframe and over the entire bandwidth according to one of the standardized time-frequency patterns. Different cells can use 6 different shifts in frequency, and 504 different signals exist. With two transmit (TX) antennas, the effective reuse for CRS is three.

As can be seen from the above, both synchronization signals and CRS are transmitted relatively often, although PSS and SSS are transmitted less frequently than CRS. This leaves enough freedom when deciding the exact timing of measurement gaps so that a gap can cover enough symbols with the signals of interest, i.e., PSS/SSS and/or CRS. With a 6 ms measurement gap, at most two SSS and two PSS symbols are possible with very precise timing, while capturing one SSS symbol and one PSS symbol is possible almost without any timing restriction on the measurement gaps since the minimum required effective measurement time is 5 ms on average.

In LTE OTDOA, the network, i.e. the eNodeB, can signal a list of cells operating on up to three frequency layers, including the serving cell frequency. The 3GPP RAN4 requirements for RSTD inter-frequency measurements are defined for two frequency layers, including the serving cell frequency. Furthermore, the measurement gaps are to be defined such that they do not overlap with PRS occasions of the serving cell layer, which would otherwise increase the effective measurement time for both the serving and the inter-frequency cell. Since the measurement gaps configured for the UE are used for RSTD measurements and also for mobility measurements, it has been agreed that the pre-defined "Gap Pattern #0", which specifies relatively dense and frequent measurement gaps, can be used only when inter-frequency RSTD measurements are configured. According to the pre-defined Gap Pattern #0 a measurement gap of 6 ms occurs every 40 ms.

As mentioned above, the measurement gaps to be applied by the UE are configured by the eNodeB over RRC. However it is the positioning server, e.g. E-SMLC, which is aware of whether and when the UE will conduct positioning inter-frequency measurements such as e.g., inter-frequency RSTD or inter-frequency E-CID and this information is transmitted to the UE transparently via the eNodeB. Thus, to be on the safe side the eNodeB may always configure UEs for the worst case, i.e. for the 40 ms measurement gap according to the Gap Pattern #0, even when the UEs measure only on intra-frequency cells. This is a severe restriction on the network in that it reduces the amount of radio resources available for intra-frequency measurements and it leads to an inefficient measurement procedure.

SUMMARY

An object of the present invention is to provide improved methods and devices for supporting configuration of a measurement gap pattern for a user equipment requiring measurement gaps for performing an inter-frequency measurement for positioning.

The above stated object is achieved by means of methods and devices according to the independent claims.

A first embodiment provides a method in a radio network node of a wireless communication system of supporting configuration of a measurement gap pattern for a user equipment requiring measurement gaps for performing an inter-frequency measurement for positioning. The method comprises receiving, from the user equipment, an indication that the user equipment is going to perform an inter-frequency measurement for positioning and that the inter-frequency measurement requires measurement gaps.

A second embodiment provides a radio network node of a wireless communication system. The radio network node is configured for signal interaction with a user equipment requiring configuration of a measurement gap pattern for performing an inter-frequency measurement for positioning. The radio network node comprises a receiver configured to receive, from the user equipment, an indication that the user equipment is going to perform an inter-frequency measurement for positioning and that the inter-frequency measurement requires measurement gaps.

A third embodiment provides a method in a user equipment of a wireless communication system of supporting configuration of a measurement gap pattern for an inter-frequency measurement for positioning performed by the user equipment. The method comprises receiving an indication that the user equipment is requested to start an inter-frequency measurement for positioning for which the user equipment requires measurement gaps. The method also comprises transmitting, to a radio network node, an indication that the user equipment is going to perform an inter-frequency measurement for positioning and that the inter-frequency measurement requires measurement gaps.

A fourth embodiment provides a user equipment for use in a wireless communication system. The user equipment is configured for signal interaction with a radio network node. The user equipment comprises a receiver configured to receive an indication that the user equipment is requested to start an inter-frequency measurement for positioning for which the user equipment requires measurement gaps. The user equipment also comprises a transmitter configured to transmit, to a radio network node, an indication that the user equipment is going to perform an inter-frequency measurement for positioning and that the UE requires measurement gaps for the inter-frequency measurement.

An advantage of some of the embodiments described herein is that by informing a radio network node that a UE is going to perform an inter-frequency measurement for positioning for which the UE requires measurement gaps, the radio network node is able to configure an appropriate measurement gap pattern for the UE. If the radio network node is not aware of when the UE is going to perform an inter-frequency measurement for positioning for which the UE requires measurement gaps, the radio network node may be required to always configure UEs for a measurement gap pattern to accommodate inter-frequency measurements for positioning, even when the UEs measure only on intra-frequency cells. This is a severe restriction on the network in that it reduces the amount of radio resources available for intra-frequency measurements and it leads to inefficient measurement procedures.

Further advantages and features of embodiments of the present invention will become apparent when reading the following detailed description in conjunction with the drawings.

DETAILED DESCRIPTION

Figure 1:
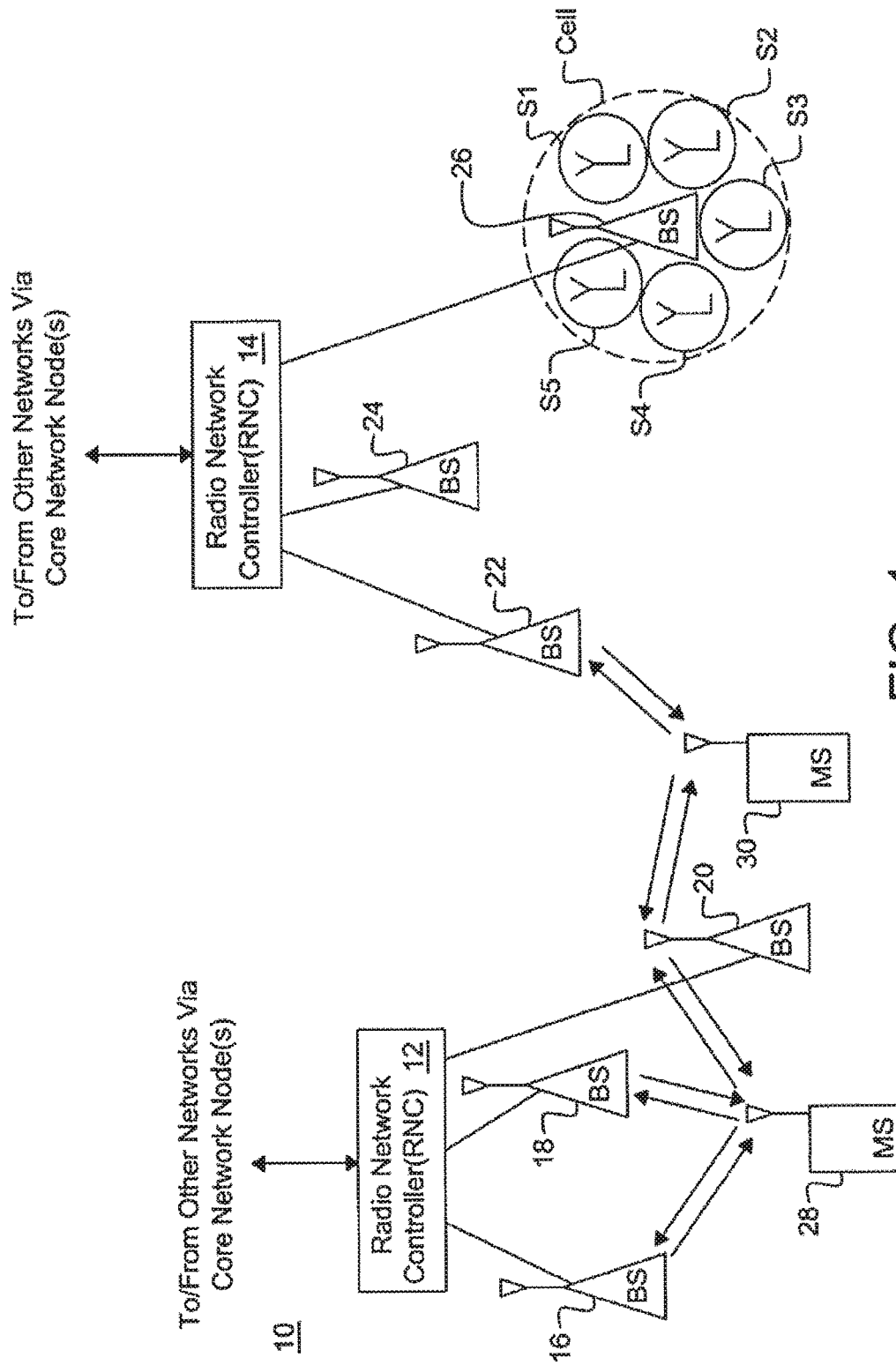
FIG. 1 is a schematic block diagram of a cellular communication system in which embodiments described herein may be implemented.

The term "UE" is used throughout this description as a non-limiting term which means any wireless device or node, e.g. PDA, laptop, mobile, sensor, fixed relay, mobile relay or even a small base station that is being positioned when timing measurements for positioning are considered, i.e. a LCS target in general. The UE may also be an advanced UE capable of such advanced features as carrier aggregation, but which may still require measurement gaps for performing measurements on at least some cells and at least some carrier frequency.

A cell is associated with a radio network node, where a radio network node comprise in a general sense any node capable of transmitting and/or receiving radio signals that may be used for positioning and/or measurements, such as e.g., an eNodeB, macro/micro/pico base station, home eNodeB, relay, beacon device, or repeater. The radio network node may be a single-RAT or multi-RAT or multi-standard radio base station. Note that downlink and uplink transmissions do not need to be between the UE and the same radio network node.

A positioning server described in different embodiments is a node with positioning functionality. For example, for LTE it may be understood as a positioning platform in the user plane, e.g., SLP in LTE, or a positioning server in the control plane, e.g., E-SMLC in LTE. SLP may also consist of SLC and SPC, as explained above, where SPC may also have a proprietary interface with E-SMLC. In a testing environment, at least the positioning server may be simulated or emulated by test equipment.

The signalling described in the different embodiments is either via direct links or logical links, e.g. via higher layer protocols such as RRC and/or via one or more network nodes. For example, in LTE in the case of signalling between E-SM LC and the LCS Client the positioning result may be transferred via multiple nodes, at least via MME and Gateway Mobile Location Centre GM LC.

Herein the term "measurement gap indication" will be used to refer to a message which indicates a need for measurement gaps for a UE. The measurement gap indication may also contain additional information such as information specifying a frequency to which the measurement relates. There may be a specific measurement gap indications used for a specific positioning method, e.g. OTDOA.

At least in some embodiments, inter-frequency measurements in the current invention shall be understood in a general sense comprising, e.g., inter-frequency, inter-band, or inter-RAT measurements. Some non-limiting examples of inter-frequency positioning measurements are inter-frequency E-CID measurements such as UE Rx-Tx time difference, RSRP and RSRQ, and inter-frequency RSTD measurements for OTDOA positioning.

At least some embodiments described herein are not limited to LTE, but may apply with any RAN, single- or multi-RAT. Some other RAT examples are LTE-Advanced, UMTS, GSM, cdma2000, WiMAX, and WiFi.

According to current 3GPP standards an eNodeB can use the following three different pre-defined measurement gap configurations for a UE to perform inter-frequency and inter-RAT measurements. The inter-frequency measurement implies measuring a carrier frequency which is different from that of the serving carrier frequency. The serving carrier frequency and inter-frequency carrier can both belong to Frequency Division Duplex (FDD) mode or Time Division Duplex (TDD) mode or any combination thereof.

According to a first pre-defined measurement gap configuration, no measurement gaps are configured. In this case, the UE is capable of performing inter-frequency and/or inter-RAT measurements without measurement gaps. This may be the case for example, if the UE has multiple receivers, which can be activated in parallel. An example is that of a multi-carrier capable UE, i.e. a UE which is capable of receiving data over more than one carrier.

According to a second pre-defined measurement configuration, measurement Gap Pattern #0 (also referred to as Gap Pattern 0) is configured. When the UE is configured with the Gap Pattern #0 for performing positioning measurements, there is no degradation of the UE inter-frequency/inter-RAT neighbor cell and positioning measurement performance. This is because according to this pattern the gaps are significantly dense and frequent i.e. a gap of 6 ms occurs every 40 ms. This means that the mobility and the positioning, e.g., OTDOA or E-CID, measurement requirements as specified in the standard shall be met.

According to a third pre-defined measurement configuration, measurement Gap Pattern #1 (also referred to as Gap Pattern 1) is configured. According to Gap Pattern #1 a gap of 6 ms occurs every 80 ms. There is a risk that UE inter-frequency/inter-RAT neighbor cell and positioning measurement performance are degraded if this pattern is used. This is due to longer periodicity of the occurrence of the measurement gaps compared to the Gap Pattern #0. A consequence could for example be significantly longer measurement period of one or more of the above measurements in order to meet the corresponding target accuracy requirements.

It should also be noted that an inter-frequency measurement configuration does not include only gap pattern, but also, for example, subframe gap offset and may include other parameters such as the SFN offset, frame offset etc.

To ensure a desired performance it is desirable that an appropriate measurement gap configuration is configured at the UE when positioning measurements, e.g., OTDOA measurement such as RSTD, are to be performed by the UE during measurement gaps. In the above E-UTRA example, the measurement Gap Pattern #0 should be configured when the UE is requested to measure the inter-frequency RSTD measurement for positioning. Furthermore, to ensure the desired performance it is also desirable that the measurement gap configuration is decided such that a sufficient amount of the reference signals, which are used for the positioning measurements in measurement gaps, fall in the measurement gaps. In E-UTRAN, the positioning reference signals (PRS) are examples of a reference signal.

The objective of configuring an appropriate measurement gap pattern can be achieved by ensuring that the radio network node, which configures the measurement gaps, is aware of that the UE has been requested to perform one or more positioning related measurements, which requires measurement gaps, and of the timing of the occurrence of the reference signals used for the positioning measurements in gaps.

Examples of information that may be used to indicate timing of the occurrence of the reference signals are timing offset such as SFN offset, frame offset, subframe offset or more specifically subframe gap offset described earlier.

Hence, embodiments described in further detail below provide the radio network node with the necessary information pertaining to the positioning measurements to be done during the measurement gaps in order to enable the radio network node to configure the appropriate measurement gap pattern for performing the positioning measurements.

In case the gaps for the positioning measurements are configured by the eNodeB, in order for the eNodeB to configure appropriate measurement gaps, information related to the measurements for the UE needs to be provided to or made available at the eNodeB.

As mentioned above FIG. 1a shows a positioning architecture. As illustrated in FIG. 1a there is an interface 163, e.g. X2, between the two eNodeBs 110a and 110b and an interface 164 between an eNodeB and a network management and/or operation and maintenance (O&M) block 141. The positioning node or positioning server 140 is here assumed to be an E-SMLC server in E-UTRAN. The protocol for messaging between the E-SMLC 140 and the eNodeBs 110a is called LPPa. The radio interface protocol between the E-SMLC 140 and the UE 150a, 150b is called LPP. Note that a link between different network entities may be a physical or a logical link. A path for higher layer protocols is a logical link which may comprise one or several physical links.

Assuming an architecture such as shown in FIG. 1a, exemplary embodiments will be described. These exemplary embodiments involve gap configuration based on explicit indication by the positioning server or UE, implicit indication by assistance data according to which the positioning server or UE forwards assistance data to the eNodeB, packet sniffing, pre-defined rules and autonomous detection. The solutions according to all embodiments described herein are applicable when the UE is in a non-Discontinuous Receive (DRX) state or in a DRX state. The embodiments are described in more detail below.

According to an embodiment which involves an explicit indication by the positioning server, the radio network node, e.g., eNodeB in E-UTRAN, changes or configures the gap configuration(s) for a particular UE, where the configuration is based on the available information regarding the positioning measurements, e.g., OTDOA RSTD inter-frequency measurements or E-CID inter-frequency measurements in E-UTRAN. The information can be cell-specific or specific for a group of UEs or for a particular UE, and it is provided to the eNodeB by the positioning server, either on request or without it e.g., by periodic or event-triggered update. Reception of such information may also be used to trigger a change of an existing gap configuration in case the existing configured gap pattern is not appropriate for the positioning measurements to be performed.

According to an exemplary embodiment, the positioning server, e.g. E-SMLC, sends a gap configuration switching indicator, cell-specific or UE-specific, to the eNodeB. The gap configuration switching indicator instructs the eNodeB to use the appropriate gap configuration for the specified UEs, a group of UEs or all UEs conducting inter-frequency measurements in the cell. The gap configuration switching indicator may e.g. be '1' when inter-frequency measurements are to be used by the specified UEs, a group of UEs or all UEs conducting inter-frequency measurements in the cell. In case the eNodeB is already using a gap pattern for a particular UE, which is not appropriate for the positioning measurement to be performed (e.g., if the pattern is expected to degrade the performance), then the eNodeB switches the existing gap pattern for that UE to the appropriate one. The appropriate gap pattern is either pre-defined or explicitly indicated by the positioning server. The positioning server also provides the information related to the carrier frequency over which the positioning measurements, e.g., RSTD, are to be performed by the UE(s) in measurement gaps. Other information, such as whether the cells on the carrier frequency are asynchronous or synchronous or timing information of the reference signals, etc., can also be provided by the positioning server to the eNodeB, which can use this to determine the most appropriate gap pattern for the measurements.

The eNodeB may optionally send an acknowledgement (ACK) to the E-SMCL to acknowledge reception of the indicator which is sent by the E-SMLC to the eNodeB. Thus the E-SMLC receives the ACK if it is used.

Further, according to an exemplary embodiment, the eNodeB sends gap reconfiguration information, e.g., details of gap pattern, subframe gap offset, frame offset, SFN offset, etc., to the UE by broadcast/multicast or unicast or a UE-specific message, e.g., via RRC signalling, where the gap configuration contains all the necessary and standardized information necessary for the UE to configure measurement gaps. The eNodeB may also store the gap configuration for each UE. The information signalled to the UE can comprise at least a time or a reference point from when the gap configuration shall apply, and/or a measurement gap configuration as such.

In a variation of the embodiment of explicit indication to the eNodeB, the eNodeB receives the information necessary for gap reconfiguration from a Network Management (NM) and O&M node 141 instead of from the positioning server 140. In this case, information originating from the positioning node 140 is also communicated to the NM and O&M node 141.

In a further variation of the embodiment of explicit indication to the eNodeB, the eNodeB receives the information necessary for appropriate measurement gap configuration or reconfiguration from the UE. The UE is made aware of that it is going to perform an inter-frequency measurement for positioning when the positioning server requests such measurements from the UE. Accordingly the UE may signal an explicit indication to indicate to the radio network node that it requires measurement gaps.

According to an embodiment which involves implicit indication, assistance data is forwarded to the eNodeB to inform the eNodeB that the UE will be performing a measurement for which measurement gaps need to be configured. According to one alternative, the positioning server 140 signals the assistance data or certain elements of the assistance data for each UE or group of UEs to the radio network node. In the E-UTRAN example illustrated in FIG. 1*a* this means that the E-SMLC 140 signals the assistance data or part of it to the eNodeB 110*a* or 110*b* over the LPPa protocol. The eNodeB 110*a/b* may also send an acknowledgement message to the E-SM LC in the same way as explained above for the exemplary embodiment with an explicit indication. The elements of the assistance data that is signalled to the eNodeB will according to an exemplary embodiment contain at least information related to the carrier frequencies of the cells which are to be used for the positioning measurements. The radio network node (i.e. the eNodeB in this example) is aware of the serving carrier frequency f1 of the UE. In case the assistance data received by the radio network node contains more than one carrier frequency, e.g., f1 and f2, or if it contains one or more carrier frequencies f2 which are different than that of the serving carrier frequency, then the radio network node can use this information to deduce that the UE is requested to do inter-frequency measurements for positioning, e.g. inter-frequency RSTD measurements. These measurements are carried out by the UE in measurement gaps. Hence the eNodeB may use this information to configure the measurement gaps, which are relevant for the positioning measurements to be performed in the measurement gaps. In E-UTRAN, this means that the eNodeB can use the received assistance data or part of it and e.g. configure Gap Pattern 0 or modify an existing Gap Pattern 1 to the Gap Pattern 0 for all measurements to be performed in measurement gaps. The configuration or modification of the measurement gaps can be done in the same manner as explained above. Accordingly the radio network node may signal information to the UE to initiate use of an appropriate gap pattern in the UE. The information signalled to the UE may e.g. comprise a determined measurement gap pattern, an indication of or reference to a pre-defined measurement gap pattern, and/or a time or reference point from when the measurement pattern to be configured is to apply.

The assistance data is sent from the positioning server 140 to the UE 150*a* or 150*b* in order to facilitate the UE to perform the positioning measurements, e.g., RSTD in case of OTDOA or signal strength/quality measurements for enhanced cell ID, etc. For example in E-UTRAN, the assistance data is sent to the UE over the LPP protocol and is specified in section 6.5.1.2 in 3GPP TS 36.355 V 9.1.0 (2010-03), Evolved Universal Terrestrial Radio Access (E-UTRA); LTE Positioning Protocol (LPP) (Release 9). Since the LPP protocol is between the UE and the E-SMLC the eNodeB does not receive the assistance data when it is transmitted from the E-SMLC to the UE. As explained above, the idea of the above described embodiment is that the assistance data or a part of the assistance data, which is sent to the UE, is also forwarded by the positioning node to the radio network node, e.g., eNodeB. In a variation of this embodiment the assistance data or part of the assistance data is forwarded to the radio network node by the UE. According to an example the data elements that are sent to the eNodeB are UE specific, sent over LPPa and are the data elements of the information element OTDOA-NeighbourCellInfoList specified in section 6.5.1.2 in 3GPP TS 36.355 cited above as follows:

"OTDOA-NeighbourCellInfoList

The IE OTDOA-NeighbourCellInfoList is used by the location server to provide neighbour cell information for OTDOA assistance data. The OTDOA-NeighbourCellInfoList is sorted according to best measurement geometry at the a priori location estimate of the target device. I.e., the target device is expected to provide measurements in increasing neighbor cell list order (to the extent that this information is available to the target device).

```
-- ASN1START
OTDOA-NeighbourCellInfoList ::= SEQUENCE (SIZE (1..maxFreqLayers)) OF
OTDOA-NeighbourFreqInfo
OTDOA-NeighbourFreqInfo ::= SEQUENCE (SIZE (1..24)) OF OTDOA-
NeighbourCellInfoElement
OTDOA-NeighbourCellInfoElement ::= SEQUENCE {
    physCellId                          INTEGER (0..503),
    cellGlobalId                        ECGI             OPTIONAL,
    earfcn                              ARFCN-ValueEUTRA OPTIONAL,        --
Cond NotSameAsRef0
    cpLength                            ENUMERATED {normal, extended, ...}
                                                        OPTIONAL,         -- Cond
NotSameAsRef1
    prsInfo                             PRS-Info         OPTIONAL,        -- Cond
NotSameAsRef2
    antennaPortConfig                   ENUMERATED {ports-1-or-2, ports-4, ...}
                                                        OPTIONAL,         -- Cond
NotsameAsRef3
    slotNumberOffset                    INTEGER(0..31)   OPTIONAL,        -- Cond
NotSameAsRef4
    prs-SubframeOffset                  INTEGER (0..1279)  OPTIONAL,      --
Cond InterFreq
    expectedRSTD                        INTEGER (0..16383),
    expectedRSTD-Uncertainty INTEGER (0..1023),
    ...
}
maxFreqLayers INTEGER ::= 3
--ASN1STOP"
```

It can be seen above that the information element contains carrier frequency information since "earfcn" is the frequency channel of the concerned cell. The eNodeB can use this information, e.g. if there is at least a carrier which is different than that of the serving carrier, to deduce whether the UE is required to perform positioning measurements, e.g., RSTD measurements, in measurement gaps or not. Accordingly the eNodeB can ensure that relevant measurement gaps are configured to facilitate measurements in gaps, such as inter-frequency RSTD measurements etc. Similarly the assistance data or part of it, such as carrier frequency information, related to other positioning methods than OTDOA, like e.g. enhanced cell ID can also be signalled to the eNodeB by the positioning sever or by the UE.

An alternative exemplary embodiment, which now will be explained, involves packet sniffing. This embodiment is useful in case the eNodeB does not have explicit or implicit information about the positioning measurements to be carried out by the UE during measurement gaps. Hence all actions including the determination whether a particular UE performs the inter-frequency measurements are performed by the eNodeB or the radio network node which configures the measurement gaps. If the radio network node which configures the measurement gaps is an eNodeB, the eNodeB can sniff packets with LPP or similar messages which are sent to the UE by the positioning sever. The sniffed messages may contain the assistance information to be used by the UE for performing the positioning measurements, e.g., inter-frequency carrier etc. The messages which contain the assistance information pass over the eNodeB transparently. Hence the eNodeB can sniff these messages. The assistance information which is acquired by sniffing enables the eNodeB to decide whether to configure a measurement gap pattern for performing inter-frequency positioning measurements or not. The measurement gap pattern may e.g. be a gap pattern which is pre-defined for positioning measurements such as Gap Pattern #0. For example, if the eNodeB detects by sniffing the assistance information that there are at least two cells in the assistance data operating on different frequencies, e.g., cell 1 and cell 2 operating on frequencies f1 and f2 respectively, then the eNodeB can assume that measurement gaps are needed for the positioning measurements. In addition the eNodeB knows the serving carrier frequency f1, which means that the eNodeB can assume that f2 is the inter-frequency. Hence the eNodeB will configure a measurement gap pattern, or adjust an existing measurement gap pattern in case a measurement gap pattern is already in operation, to ensure that sufficient amount of the reference signals on carrier f2 fall within the measurements gaps of the configured or adjusted measurement gap pattern. The reference signal may e.g. be PRS on f2 and the measurement gap pattern may e.g. be configured or adjusted such that at least one sub-frame containing the reference signal falls within the measurement gaps. The configuration of the measurement gap patterns in the UE can be carried out in the same way as described above irrespective of whether the radio network node is made aware of the UE's need for measurement gaps for performing an inter-frequency measurement for positioning by means of sniffing or by means of another method such as explicit or implicit indication from the positioning server or the UE.

Another alternative embodiment involves a pre-defined rule in the UE. When assistance data is received by the UE, e.g., via LPP, and the UE will conduct inter-frequency measurements or another type of measurements in measurement gaps for carrier f1 and carrier f2 then the UE itself reconfigures the measurement gaps which are most relevant for the measurements to be performed. The carriers f1 and f2 can be given in the field 'earfcn' of the assistance data as mentioned above. The measurement gap to be configured or re-configured can be pre-defined in a standard. Accordingly the UE can configure the measurement gaps by itself following one or several pre-defined rules. The following pre-defined set of rules can for example be used:

```
If exist f2≠ f1
    If (current_status==no_gaps)
            change to: gap configuration #0,
    if (current_status==gap_configuration #1)
            -> change to: gap configuration #0,
    Otherwise, no change.
```

The above exemplary pre-defined set of rules means that the UE changes a current gap configuration to the pre-defined gap pattern configuration, which is appropriate for the positioning measurements to be done in the measurement gaps, e.g., inter-frequency measurements.

In a variation of this embodiment, if the solution of pre-defined rules for the UE is used, the UE can indicate to the eNodeB that "positioning ongoing" and that it needs the Gap Pattern 0. When positioning is no longer wanted the UE can update the eNodeB again. This information "positioning ongoing" can be transferred over an X2 interface as well, e.g., to a node associated with the new serving cell of the UE when the UE performs handover, or to a neighbour node to indicate a measurement gap pattern for positioning measurements used in this cell.

Yet another exemplary embodiment involves autonomous detection in a network node. In case RS or PRS used by the UE for performing positioning measurements are configured on more than one carrier frequency in the eNodeB, then the eNodeB may be configured to always use the most appropriate gap pattern required for performing positioning measurements, e.g., the eNodeB configures only Gap Pattern 0 for all measurements in E-UTRAN. The eNodeB assumes that measurements on at least one of the carrier frequencies are done in gaps. Secondly the measurement gaps are configured to ensure that as many PRS sub-frames as possible on different carriers lie in the measurement gaps. This embodiment is useful in case the eNodeB does not have any other means to determine whether positioning measurements are done in measurement gaps or not for a particular UE.

A further exemplary embodiment involves using an X2 interface for specifically exchanging the information about cells on frequencies used for positioning. It is possible in LTE for eNodeBs to exchange information over the X2 interface. The information can be, for example, a list of all bandwidths over all carriers in the associated cells. According to this embodiment the eNodeBs, in addition to the carrier information also include information on whether the carrier is used for positioning measurements e.g., whether frequency f1 is used for PRS transmissions and/or configuring positioning subframes or the UEs conduct positioning measurements on CRS. In another embodiment, PRS transmission bandwidth is also exchanged via X2.

Yet a further exemplary embodiment involves applying a default measurement gap configuration. Examples of default configurations which may be applied are:

In a multi-RAT and/or multi-frequency system, when sites are co-located, the eNodeB can decide to use Gap Pattern 0 when different cells of the site are operating on different frequencies/RATs.

Gap Pattern 0 is always used as a default gap configuration in an eNodeB when the network provides positioning services.

Gap Pattern 0 is used as a default configuration in an eNodeB when PRS is transmitted.

Configuration of Gap pattern 0 is triggered by a positioning request.

The Gap configuration, e.g., gap pattern, of an eNodeB can be decided and configured by another node, e.g., the NM and/O&M node 141, a Self Organizing Network (SON) node, a macro eNodeB, etc.

The default gap configuration is used by the eNodeB when configuring the UE for inter-frequency measurements. In one embodiment, the eNodeB reconfigures the UEs to the new default gap configuration in one of the events listed above and the default configuration changes.

The embodiments described above enjoy a number of advantages over previous methods and apparatus, including, for example, solving the problem of incomplete support for inter-frequency measurements.

Some of the embodiments described above involves that the UE indicates a need for measurement gaps to the radio network node. Such an indication may be signaled to the radio network node by means of RRC signaling. An advantage of the UE sending the indication, rather than the positioning server, is that this embodiment is applicable for user plane positioning as well as for control plane positioning. It is not certain that the positioning server knows if the UE actually requires measurement gaps, since the positioning server might not have full knowledge of the UEs capabilities. Accordingly an advantage of having the UE itself indicate its need for measurement gaps is that it reduces the risk of configuring measurement gaps in cases where the UE does not require measurement gaps.

Figure 6:
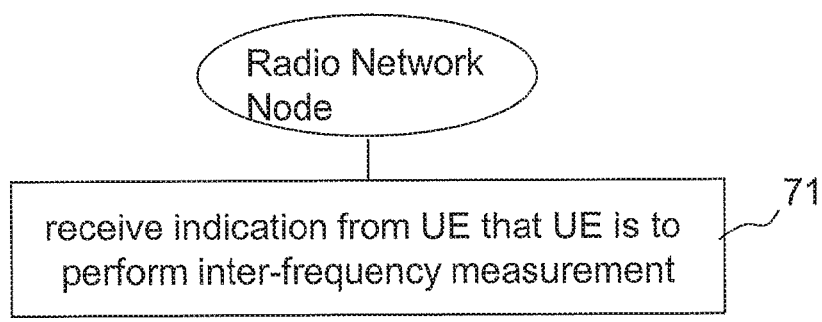
FIG. 6 is a flow diagram illustrating an exemplary embodiment of a method in a radio network node for supporting configuration of a measurement gap pattern for a UE requiring measurement gaps for performing an inter-frequency measurement.

FIG. 6 is a flow diagram of a method in a radio network node for supporting configuration of a measurement gap pattern for a UE requiring measurement gaps for performing an inter-frequency measurement. The method comprises receiving, in a step 71, from the UE an indication that the UE is going to perform an inter-frequency measurement for positioning and that the inter-frequency measurement requires measurement gaps. The inter-frequency measurement may e.g. be a Reference Signal Time Difference, RSTD, measurement. The received indication may include an indication of a measurement gap pattern that the UE needs for performing the inter-frequency measurement. Such an indication may be an indication of a need for configuring a pre-defined measurement gap pattern, such as Gap Pattern #0 which specifies a gap of 6 ms that occurs every 40 ms.

Figure 7:
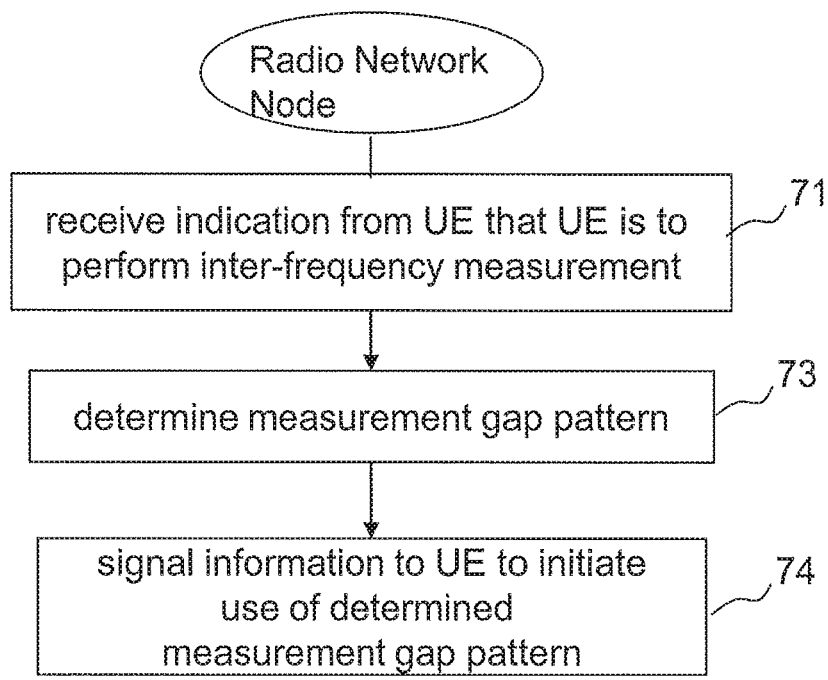
FIG. 7 is a flow diagram illustrating an alternative exemplary embodiment of a method in a radio network node for supporting configuration of a measurement gap pattern for a UE requiring measurement gaps for performing an inter-frequency measurement.

FIG. 7 is a flow diagram illustrating an alternative embodiment in a radio network node for supporting configuration of a measurement gap pattern for a UE requiring measurement gaps for performing an inter-frequency measurement. The step 71 in which the radio network node receives, from the user equipment, an indication that the UE is going to perform an inter-frequency measurement for positioning and that the inter-frequency measurement requires measurement gaps, is the same as explained above in connection with FIG. 6. The method in FIG. 7 also comprises a step 73, in which the radio network node determines, based on the received indication, a measurement gap pattern for performing the inter-frequency measurement. A further step 74 comprises signaling to the UE information to initiate use of the determined measurement gap pattern in the UE. The information that is signaled to the UE may e.g. include a time or reference point from when the determined gap pattern is to apply and/or the determined measurement gap pattern. The information signaled to the UE may e.g. specify gap offset and/or a pattern activation time to be applied.

According to further variations of the embodiments illustrated in FIG. 6 and FIG. 7 the radio network node may store information on the determined measurement gap pattern associated with the UE. Thus the radio network node may store information on different measurement gap patterns configured for different UEs. In another variation the radio network node receives from the UE an indication that the user equipment is going to stop the inter-frequency measurement. Thus the radio network node is informed that the UE no longer needs the measurement gap pattern for performing the inter-frequency measurement.

Figure 8:
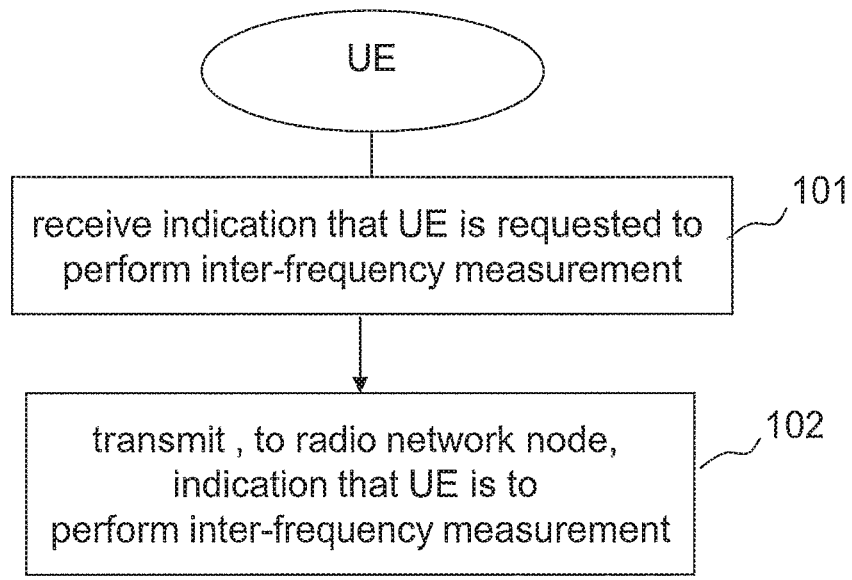
FIG. 8 is a flow diagram illustrating an exemplary embodiment of a method in a UE for supporting configuration of a measurement gap pattern for the UE for performing an inter-frequency measurement.

FIG. 8 is a flow diagram of a method in a UE for supporting configuration of a measurement gap pattern for an inter-frequency measurement performed by the UE. The method comprises receiving an indication that the user equipment is requested to start an inter-frequency measurement for positioning for which the user equipment requires measurement gaps in a step 101. The indication that the UE is requested to start an inter-frequency measurement may be received from a positioning server such as an E-SMCL or SLP. In a step 102, the UE transmits, to a radio network node, an indication that the UE is going to perform an inter-frequency measurement for positioning and that the inter-frequency measurement requires measurement gaps. If the UE has capabilities for performing the inter-frequency measurement without measurement gaps it should not indicate to the radio network node that it requires measurement gaps for performing the inter-frequency measurement. The indication transmitted to the radio network node may include an indication of a measurement gap pattern that the user equipment needs for performing the inter-frequency measurement. In a variation of the illustrated embodiment, the UE also transmits to the radio network node an additional indication that indicates that the user equipment is going stop the inter-frequency measurement. The indication may apply for one or more pre-defined positioning methods, e.g., OTDOA and/or E-CID.

Figure 9:
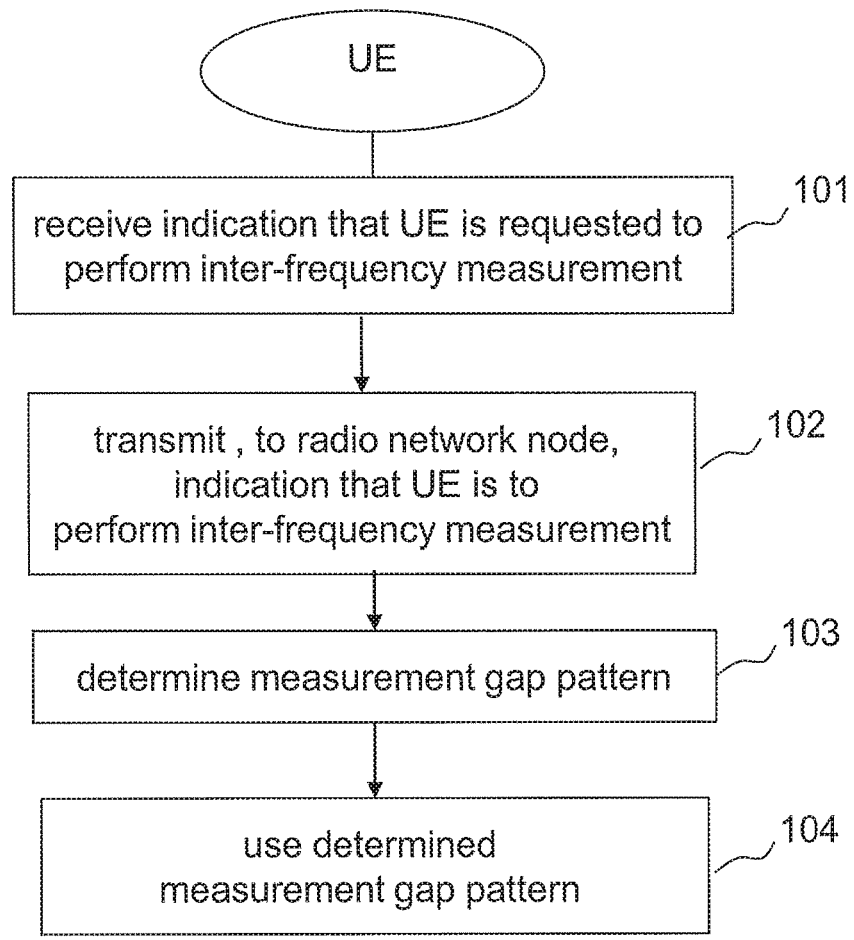
FIG. 9 is a flow diagram illustrating an alternative exemplary embodiment of a method in a UE for supporting configuration of a measurement gap pattern for the UE for performing an inter-frequency measurement.
Figure 10:
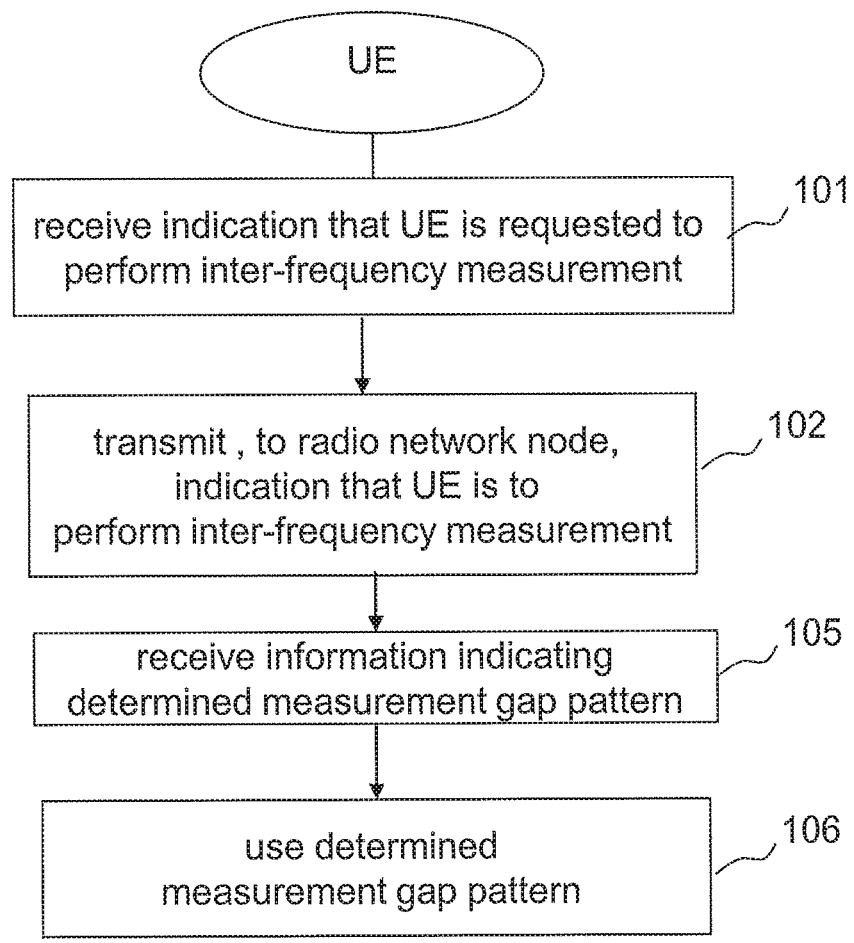
FIG. 10 is a flow diagram illustrating another alternative exemplary embodiment of a method in a UE for supporting configuration of a measurement gap pattern for the UE for performing an inter-frequency measurement.

As described above there are embodiments in which the radio network node configures the measurement gap pattern to be applied by the UE and other embodiments in which the UE itself configures the measurement gap pattern based on pre-defined rules in the UE. FIGS. 9 and 10 are flow diagrams illustrating embodiments according to these different alternatives.

FIG. 9 illustrates a method in which the UE itself configures a measurement gap pattern to be used for inter-frequency positioning measurements. The method comprises the steps 101 and 102 which are the same as described above in connection with FIG. 8. In addition the method comprises a step 103 in which the UE determines the measurement gap pattern to be used for performing the inter-frequency measurement. The step 103 is initiated in response to receiving the indication that the UE is requested to perform the inter-frequency measurement. The UE determines the measurement gap pattern based on a pre-defined set of rules. In a step 104 the determined measurement gap pattern is configured in the UE.

FIG. 10 illustrates a method in which the UE receives information on the determined measurement gap configuration from the radio network node. The method comprises the steps 101 and 102 which are the same as described above in connection with FIG. 8. In addition the method comprises a step 105 in which the UE receives from the radio network node information indicating a determined measurement gap pattern to be used for performing the inter-frequency measurement. In a step 106 the UE uses the determined measurement gap pattern.

In a variation the methods illustrated in FIGS. 9 and 10 also includes as step in which the UE determines based on the UE's capabilities that it requires measurement gaps to perform the inter-frequency measurement for positioning. If the UE is capable of performing the inter-frequency measurement for positioning, the UE should of course not send any indication to the radio network node that it requires measurement gaps for performing the inter-frequency measurement for positioning.

Figure 11:
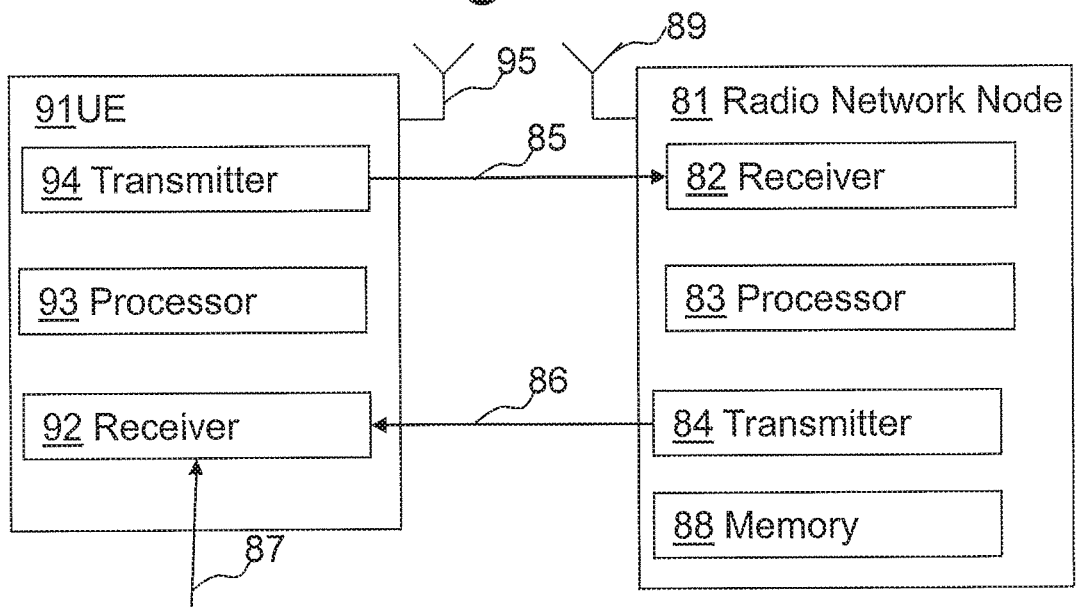
FIG. 11 is a schematic block diagram illustrating exemplary embodiments of a UE and a radio network node.

FIG. 11 is a schematic block diagram illustrating exemplary embodiments of a radio network node 81 and a UE 91 respectively, which may be configure to perform the methods illustrated in FIGS. 6-10.

The radio network node 81 comprises a receiver 82, a processor 83, a transmitter 84, and at least one antenna 89 and a memory 88. The receiver 82 may be configured to receive an indication 85 that indicates that UE is to perform an inter-frequency measurement for which the UE requires measurement gaps. The processor 83 may be configured to determine the measurement gap pattern based on the indication 85 and the transmitter 84 may be configured to transmit information 86 to the UE to initiate use of the determined measurement gap pattern. The memory 88 may store information on determined measurement gap patterns for different UEs.

The UE 91 comprises a receiver 92, a processor 93, a transmitter 94, and at least one antenna 95. The receiver 92 is configured to receive an indication 87, e.g. from a positioning server, which indicates, that the UE is requested for perform an inter-frequency measurement. The transmitter 94 is configured to transmit the indication 85 to the radio network node 81. The processor 93 may be configured to determine the measurement gap pattern to be applied according to a set of pre-defined rules.

The functional blocks depicted in FIG. 11 can be combined and re-arranged in a variety of equivalent ways, and many of the functions can be performed by one or more suitably programmed digital signal processors and other known electronic circuits e.g., discrete logic gates interconnected to perform a specialized function, or application-specific integrated circuits. Moreover, connections among and information provided or exchanged by the functional blocks depicted in FIG. 11 can be altered in various ways to enable a radio network node and a UE respectively to implement the methods described above and other methods involved in the operation of the radio network node or the UE in a wireless communication system.

Many aspects of the embodiments presented herein are described in terms of sequences of actions that can be performed by, for example, elements of a programmable computer system. Embodiments of UEs include, for example, mobile telephones, pagers, headsets, laptop computers and other mobile terminals, and the like. Moreover, some embodiments described herein can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber. Thus, there are numerous different embodiments in many different forms, not all of which are described above, that fall within the scope of the appended claims. For each of the various aspects, any such form may be referred to as "logic configured to" perform a described action, or alternatively as "logic that" performs a described action.

Several of the embodiments described above use an LTE scenario as an exemplary application scenario. LTE standard specifications can be seen as an evolution of the current wideband code division multiple access (WCDMA) specifications. An LTE system uses orthogonal frequency division multiplex (OFDM) as a multiple access technique (called OFDMA) in a downlink (DL) from system nodes to user equipments (UEs). An LTE system has channel bandwidths ranging from about 1.4 MHz to 20 MHz, and supports throughputs of more than 100 megabits per second (Mb/s) on the largest-bandwidth channels. One type of physical channel defined for the LTE downlink is the physical downlink shared channel (PDSCH), which conveys information from higher layers in the LTE protocol stack and to which one or more specific transport channels are mapped. Control information is conveyed by a physical uplink control channel (PUCCH) and by a physical downlink control channel (PDCCH). LTE channels are described in 3GPP Technical Specification (TS) 36.211 V9.1.0, Physical Channels and Modulation (Release 9) (December 2009), among other specifications.

An IMT-Advanced communication system uses an internet protocol (IP) multimedia subsystem (IMS) of an LTE, HSPA, or other communication system for IMS multimedia telephony (IMT). In the IMT advanced system (which may be called a "fourth generation" (4G) mobile communication system), bandwidths of 100 MHz and larger are being considered. The 3 GPP promulgates the LTE, HSPA, WCDMA, and IMT specifications, and specifications that standardize other kinds of cellular wireless communication systems.

In an OFDMA communication system, the data stream to be transmitted is portioned among a number of narrowband subcarriers that are transmitted in parallel. In general, a resource block devoted to a particular UE is a particular number of particular subcarriers used for a particular period of time. Different groups of subcarriers can be used at different times for different users. Because each subcarrier is narrowband, each carrier experiences mainly flat fading, which makes it easier for a UE to demodulate each subcarrier. OFDMA communication systems are described in the literature, for example, U.S. Patent Application Publication No. US 2008/0031368 A1 by B. Lindoff et al.

Figure 1A:
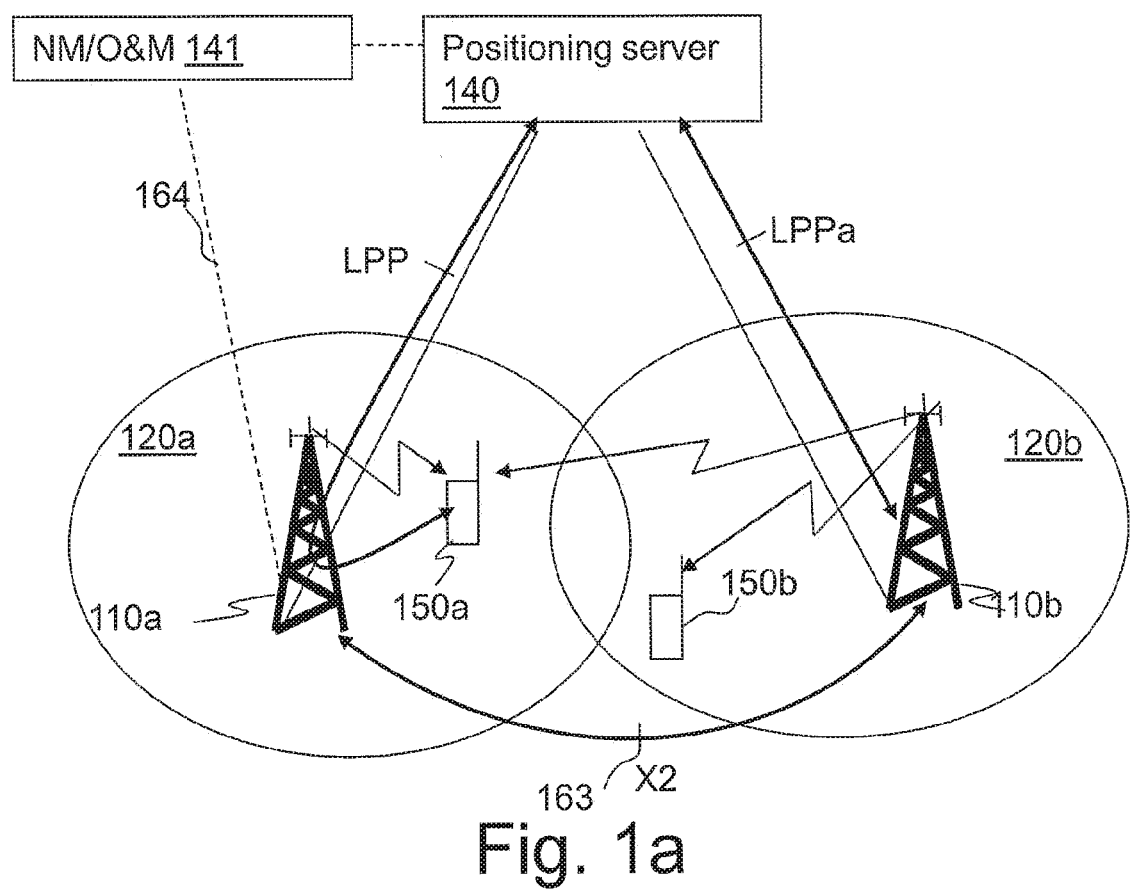
FIG. 1a is a schematic block diagram of wireless communication system, including a positioning server, in which embodiments described herein may be implemented.
Figure 2:
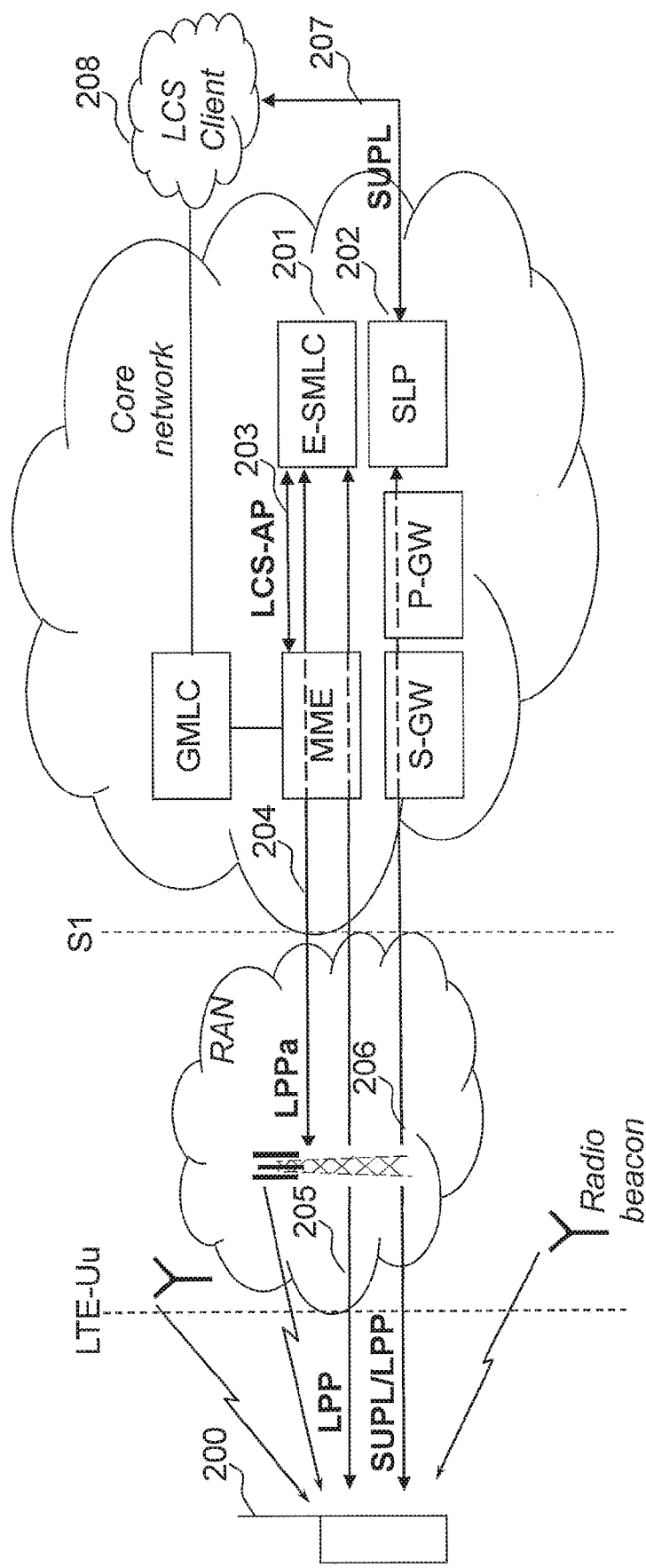
FIG. 2 is a schematic block diagram illustrating an LTE system with positioning functionality.
Figure 3:
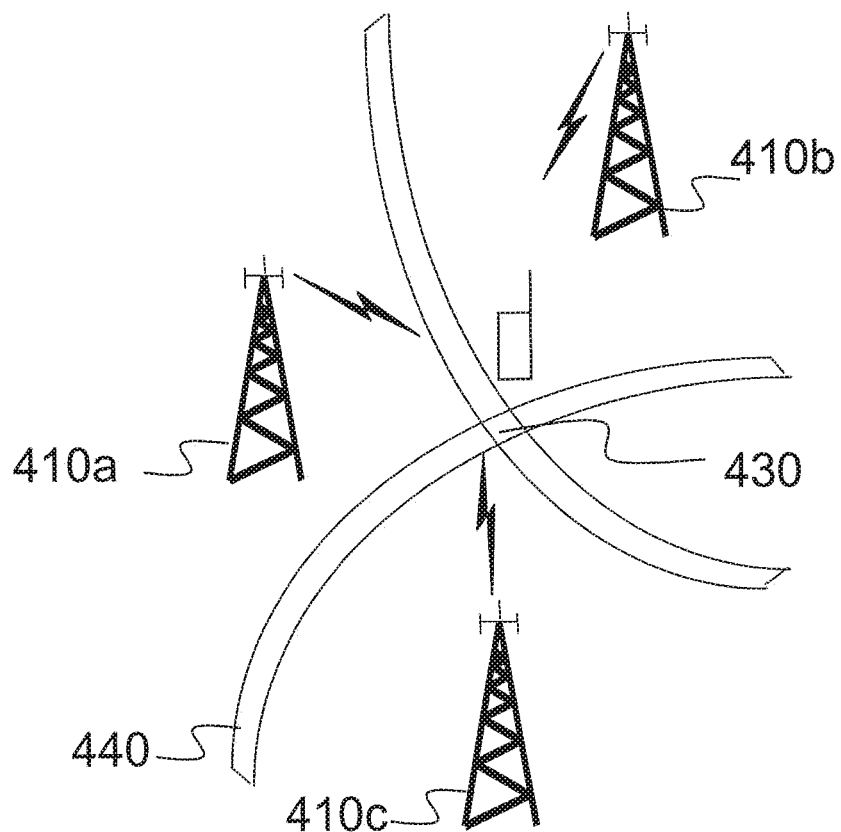
FIG. 3 is a schematic block diagram illustrating positioning of a user equipment (UE) by determining an intersection of hyperbolas corresponding to measured Reference Signal Time Differences (RSTDs).
Figure 4:
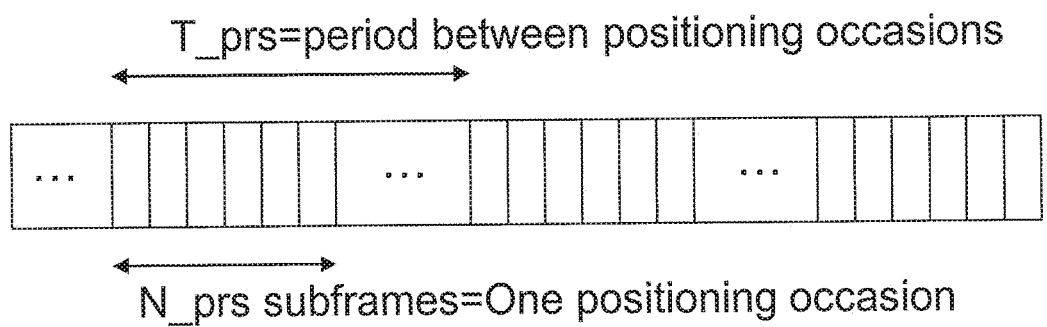
FIG. 4 is a schematic block diagram illustrating a measurement gap pattern.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26. Each BS, or eNodeB which is a BS in an LTE system, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It will be understood that the arrangement of functionalities depicted in FIG. 1 can be modified in LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

The use of multiple antennas plays an important role in modern wireless communication systems, such as LTE systems, to achieve improved system performance, including capacity and coverage, and service provisioning. Acquisition of channel state information (CSI) at the transmitter or the receiver is important to proper implementation of multi-antenna techniques. In general, channel characteristics, such as the impulse response, are estimated by sending and receiving one or more predefined training sequences, which can also be called reference signals. To estimate the channel characteristics of a DL for example, a BS transmits reference signals to UEs, which use the received versions of the known reference signals to estimate the DL channel. The UEs can then use the estimated channel matrix for coherent demodulation of the received DL signal, and obtain the potential beam-forming gain, spatial diversity gain, and spatial multiplexing gain available with multiple antennas. In addition, the reference signals can be used to do channel quality measurement to support link adaptation.

In the case of OFDM transmission, a straightforward design of a reference signal is to transmit known reference symbols in the OFDM frequency-vs.-time grid. Cell-specific reference signals and symbols are described in Clauses 6.10 and 6.11 of 3GPP TS 36.211 V9.0.0, Evolved Universal Terrestrial Radio Access (E-UTRA), Physical Channels and Modulation (Release 9) (December 2009). Up to four cell-specific reference signals corresponding to up to four transmit antennas of an eNodeB are specified. Such reference signals are used by the eNodeB for codebook-based, multiple-stream, spatial multiplex transmission. A codebook is a predefined finite set of a number of precoding matrices having different ranks. In codebook based precoding, the UE estimates the channel matrix based on the cell-specific reference signals, carries out an exhaustive search over all precoding matrices, and reports a preferred precoding matrix indicator (PMI) to the eNodeB according to certain criteria, thereby maximizing system throughput, etc. The PMI determined by a UE can be overridden by the eNodeB.

3GPP TS 36.211 also defines a UE-specific reference signal on an antenna port 5 that is transmitted only on resource blocks upon which a corresponding physical downlink shared channel (PDSCH) is mapped. The UE-specific reference signal supports non-codebook based, single-stream beamforming transmission. In non-codebook based precoding, the precoding weight matrix applied both on UE-specific reference symbols and the data symbols is not from the codebook set but is directly calculated by the eNodeB in terms of various criteria, e.g., the weight matrix can be calculated based on eigen decomposition or on direction of arrival. In a time-division duplex (TDD) system, due to channel reciprocity, non-codebook based beamforming/precoding can reduce further uplink feedbacks and improve beamforming gain.

The DL of a LTE system can use both codebook-based precoding and non-codebook based beamforming/precoding for up to four transmit antennas. The transmission mode switch between codebook-based, multiple-stream spatial multiplexing transmission and non-codebook-based, single-stream beamforming transmission is semi-statically configured via higher layer signaling.

Some communication systems, such as LTE-Advanced that is currently being specified by 3GPP, can employ more than four transmit antennas in order to reach more aggressive performance targets. For example, a system having eNodeBs with eight transmit antennas need extension of current LTE codebook-based precoding from precoder and reference signal perspectives.

Figure 5:
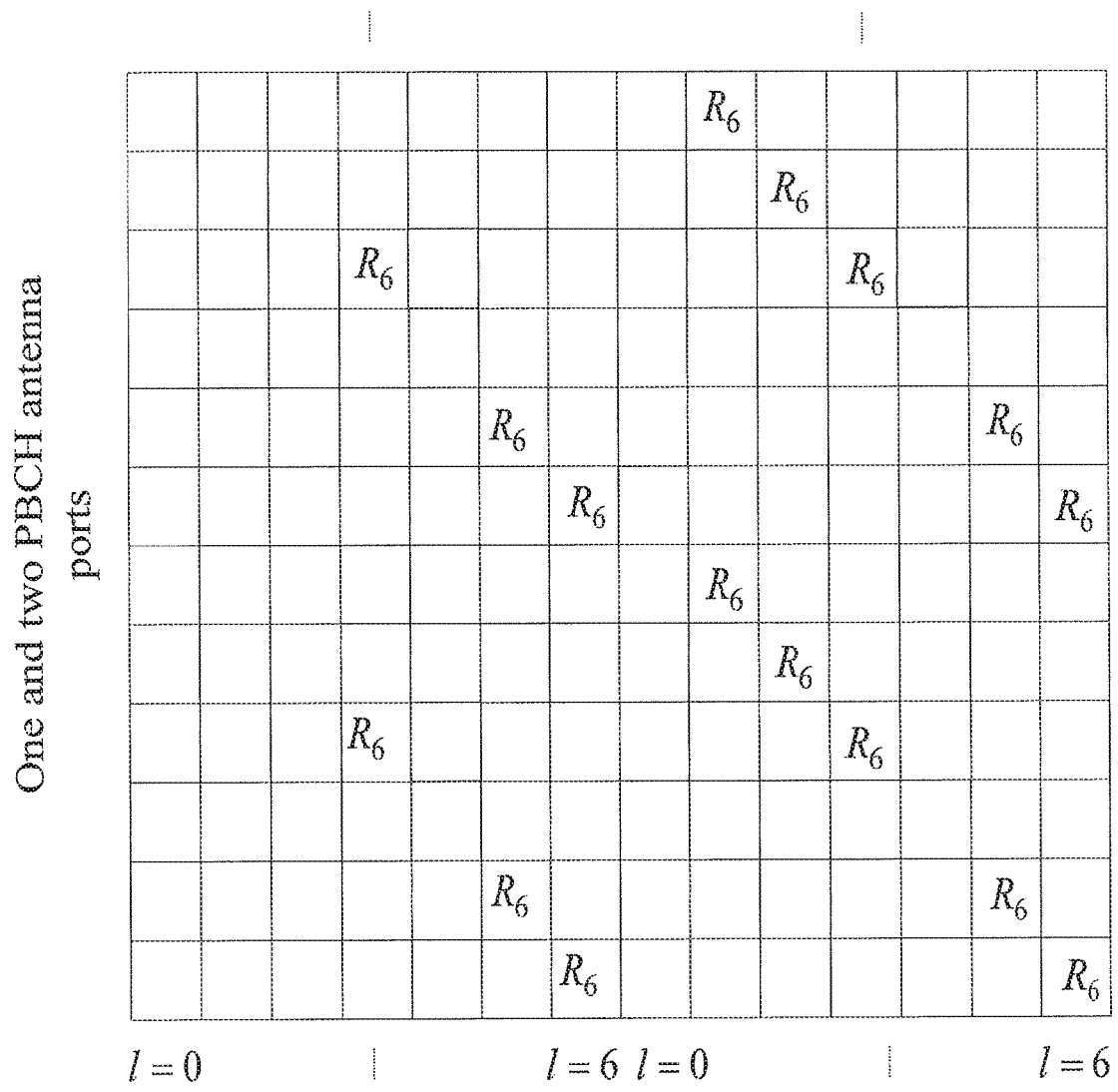
FIG. 5 is a schematic block diagram illustrating a Positioning Reference Signal pattern when one or two antennas are used for a Physical Broadcast Channel (PBCH).

PRS are transmitted from one antenna port (R6) according to a pre-defined pattern, as described for example in Clause 6.10.4 of 3GPP TS 36.211 V9.0.0, Evolved Universal Terrestrial Radio Access (E-UTRA), Physical Channels and Modulation (Release 9) (December 2009). One of the currently agreed PRS patterns is shown in FIG. 5, which corresponds to the left-hand side of FIG. 6. 10.4.2-1 of 3GPP TS 36.211, where the squares containing $R_6$ indicate PRS resource elements within a block of twelve subcarriers over fourteen OFDM symbols (i.e., a 1-ms subframe with normal cyclic prefix).

A set of frequency shifts can be applied to the pre-defined PRS patterns to obtain a set of orthogonal patterns which can be used in neighbor cells to reduce interference on the PRS and thus improve positioning measurements. The effective frequency reuse of six can be modelled in this way. The frequency shift is defined as a function of Physical Cell ID (PCI) as follows:

$$v_{shift} = \text{mod}(PCI, 6)$$

in which $v_{shift}$ is the frequency shift, mod( ) is the modulo function, and PCI is the Physical Cell ID. The PRS can also be transmitted with zero power, or muted.

To improve hearability of the PRS, i.e., to enable detecting the PRS from multiple sites and with a reasonable quality, positioning subframes have been designed as low-interference subframes, i.e., it has also been agreed that no data transmissions are allowed in general in positioning subframes. As a result, synchronous networks' PRS are ideally interfered with only by PRS from other cells having the same PRS pattern index, i.e., the same vertical shift (v_shift), and not by data transmissions.

In partially aligned asynchronous networks, PRS can still be interfered with by transmissions over data channels, control channels, and any physical signals when positioning subframes collide with normal subframes, although the interference is reduced by the partial alignment, i.e., by aligning the beginnings of positioning subframes in multiple cells within one-half of a subframe with respect to some time base. PRS are transmitted in pre-defined positioning subframes grouped by several consecutive subframes ($N_{PRS}$), i.e., one positioning occasion, which occur periodically with a certain periodicity of N subframes, i.e., the time interval between two positioning occasions. The currently agreed periods N are 160, 320, 640, and 1280 ms, and the number of consecutive subframes $N_{PRS}$ can be 1, 2, 4, or 6, as described in 3GPP TS 36.211 cited above.

As described above, methods and apparatus according to the embodiments presented above include, but are not limited to, one or more of the following aspects: signalling to support gap configuration, methods for gap configuration and using an X2 interface for exchanging the information on the frequency used for positioning measurements.

In addition, embodiments described above can be incorporated in user- and/or control-plane positioning solutions, although the latter is currently believed to be more common, and in other positioning methods and their hybrids, in addition to OTDOA and E-CID. It will be understood that this description is given in terms of an eNodeB as the radio network node, but the invention can be embodied in other types of radio network nodes, e.g., pico BSs, home NodeBs, etc.

The invention claimed is:

1. A method in a user equipment of a wireless communication system for the user equipment to itself configure a measurement gap pattern to be used for an inter-frequency positioning measurement, the method comprising:
   determining, based on one or more pre-defined rules, a measurement gap pattern to be used for performing an inter-frequency positioning measurement; and
   using the determined measurement gap pattern to perform the inter-frequency positioning measurement.

2. The method of claim 1, further comprising transmitting, to a radio network node, an indication that the user equipment is going to perform an inter-frequency positioning measurement that requires measurement gaps.

3. The method of claim 1, further comprising receiving an indication that the user equipment is requested to start the inter-frequency positioning measurement, and wherein said determining is performed in response to receiving the indication.

4. The method of claim 1, wherein said determining comprises determining, based on the one or more pre-defined rules, that a pre-defined measurement gap pattern is to be used for the inter-frequency positioning measurement.

5. The method of claim 4, wherein the wireless communication system is a Long Term Evolution system, and wherein the pre-defined measurement gap pattern is gap configuration #0.

6. The method of claim 1, wherein said determining comprises deciding on a measurement gap pattern to use for performing the inter-frequency positioning measurement, based on one or more pre-defined rules which specify a measurement gap pattern to use for an inter-frequency measurement that is a positioning measurement.

7. The method of claim 1, comprising reconfiguring a measurement gap pattern used by the user equipment, based on determining that an inter-frequency measurement to be performed is a positioning measurement.

8. The method of claim 1, wherein the one or more pre-defined rules specify that the user equipment is to change to using a particular measurement gap pattern if a positioning measurement to be performed is an inter-frequency positioning measurement, wherein the particular measurement gap pattern is pre-defined as appropriate for a positioning measurement to be performed in measurement gaps.

9. A user equipment, for use in a wireless communication system, configured to itself configure a measurement gap pattern to be used for an inter-frequency positioning measurement, the user equipment comprising:
   processing circuitry and a memory, the memory containing instructions executable by the processing circuitry whereby the user equipment is configured to:
   determine, based on one or more pre-defined rules, a measurement gap pattern to be used for performing an inter-frequency positioning measurement; and
   use the determined measurement gap pattern to perform the inter-frequency positioning measurement.

10. The user equipment of claim 9, wherein the memory contains instructions executable by the processing circuitry whereby the user equipment is configured to transmit, to a radio network node, an indication that the user equipment is going to perform an inter-frequency positioning measurement that requires measurement gaps.

11. The user equipment of claim 9, wherein the memory contains instructions executable by the processing circuitry whereby the user equipment is configured to receive an indication that the user equipment is requested to start the inter-frequency positioning measurement, and to perform said determination in response to receiving the indication.

12. The user equipment of claim 9, wherein the memory contains instructions executable by the processing circuitry whereby the user equipment is configured to determine, based on the one or more pre-defined rules, that a pre-defined measurement gap pattern is to be used for the inter-frequency positioning measurement.

13. The user equipment of claim 12, wherein the wireless communication system is a Long Term Evolution system, and wherein the pre-defined measurement gap pattern is gap configuration #0.

14. The user equipment of claim 9, wherein the memory contains instructions executable by the processing circuitry whereby the user equipment is configured to decide on a measurement gap pattern to use for performing the inter-frequency positioning measurement, based on one or more pre-defined rules which specify a measurement gap pattern to use for an inter-frequency measurement that is a positioning measurement.

15. The user equipment of claim 9, wherein the memory contains instructions executable by the processing circuitry whereby the user equipment is configured to reconfigure a measurement gap pattern used by the user equipment, based on determining that an inter-frequency measurement to be performed is a positioning measurement.

16. The user equipment of claim 9, wherein the one or more pre-defined rules specify that the user equipment is to change to using a particular measurement gap pattern if a positioning measurement to be performed is an inter-frequency positioning measurement, wherein the particular measurement gap pattern is pre-defined as appropriate for a positioning measurement to be performed in measurement gaps.

* * * * *

UNITED STATES PATENT AND TRADEMARK OFFICE
CERTIFICATE OF CORRECTION

PATENT NO. : 9,635,637 B2
APPLICATION NO. : 15/173882
DATED : April 25, 2017
INVENTOR(S) : Siomina et al.

It is certified that error appears in the above-identified patent and that said Letters Patent is hereby corrected as shown below:

On the Title Page

Item (71), under "Applicant", in Column 1, Line 2, delete "OT (SE)" and insert -- (SE) --, therefor.

In the Specification

In Column 1, Line 9, delete "2015," and insert -- 2015, now Pat. No. 9,414,349, --, therefor.

In Column 2, Line 37, delete "Plane" and insert -- Plane Location --, therefor.

In Column 2, Line 57, delete "E-SM LC" and insert -- E-SMLC --, therefor.

In Column 2, Line 59, delete "(P-GVV)" and insert -- (P-GW) --, therefor.

In Column 3, Line 32, delete "3 GPP." and insert -- 3GPP. --, therefor.

In Column 4, Line 47, delete "N-prs," and insert -- N_prs --, therefor.

In Column 5, Line 34, delete "Receiver" and insert -- Received --, therefor.

In Column 7, Line 40, delete "of wireless" and insert -- of a wireless --, therefor.

In Column 8, Line 48, delete "E-SM LC" and insert -- E-SMLC --, therefor.

In Column 8, Line 50, delete "GM LC." and insert -- GMLC. --, therefor.

In Column 10, Line 20, delete "FIG. 1a" and insert -- FIG. 1a, --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,635,637 B2

In Column 10, Line 25, delete "E-SM LC" and insert -- E-SMLC --, therefor.

In Column 10, Line 26, delete "E-SM LC" and insert -- E-SMLC --, therefor.

In Column 10, Line 28, delete "E-SM LC" and insert -- E-SMLC --, therefor.

In Column 10, Line 41, delete "non-Discontinuous Receive" and insert -- non-Discontinuous Reception --, therefor.

In Column 11, Line 2, delete "cell ." and insert -- cell. --, therefor.

In Column 11, Line 21, delete "E-SMCL" and insert -- E-SMLC --, therefor.

In Column 11, Line 64, delete "1a" and insert -- 1a, --, therefor.

In Column 11, Line 67, delete "E-SM LC" and insert -- E-SMLC --, therefor.

In Column 12, Line 59, delete ""OTDOA-NeighbourCellInfoList" and insert -- OTDOA-NeighbourCellInfoList. --, therefor.

In Columns 13 & 14, Line 9, delete "ARFCN-ValueEUTRA" and insert -- EARFCN-ValueEUTRA --, therefor.

In Columns 13 & 14, Line 26, delete "--ASN1STOP"" and insert -- --ASN1STOP --, therefor.

In Column 13, Line 39, delete "positioning sever" and insert -- positioning server --, therefor.

In Column 13, Line 51, delete "positioning sever." and insert -- positioning server. --, therefor.

In Column 17, Line 6, delete "E-SMCL" and insert -- E-SMLC --, therefor.

In Column 17, Line 22, delete "going stop" and insert -- going to stop --, therefor.

In Column 19, Line 28, delete "3 GPP" and insert -- 3GPP --, therefor.

In Column 21, Line 48, delete "some time" and insert -- sometime --, therefor.